United States Patent [19]
Peterson

[11] Patent Number: 5,415,273
[45] Date of Patent: May 16, 1995

[54] ARCUATE PATH CHAIN BELT HARVESTER

[76] Inventor: Myron A. Peterson, 221 Carr Rd., Pasco, Wash. 99301

[21] Appl. No.: 152,307

[22] Filed: Nov. 12, 1993

[51] Int. Cl.⁶ .............................................. B65G 15/02
[52] U.S. Cl. ...................... 198/831; 198/835
[58] Field of Search ............ 198/831, 300, 835; 171/138

[56] References Cited

U.S. PATENT DOCUMENTS

| | | | |
|---|---|---|---|
| 502,328 | 8/1893 | Storle | 198/831 |
| 555,251 | 2/1896 | Leidiger | 171/138 |
| 591,388 | 10/1897 | Dowden | |
| 1,207,065 | 12/1916 | Miller | 198/831 |
| 2,365,077 | 12/1944 | Hertzler et al. | 171/138 |
| 2,413,339 | 12/1946 | Stadelman | 198/831 |
| 2,537,320 | 1/1951 | Stauffer | 171/138 |
| 3,468,408 | 9/1969 | Hammond et al. | 198/835 |
| 3,496,713 | 2/1970 | Reinhardt et al. | 171/100 |
| 3,620,355 | 11/1971 | Jones, Jr. et al. | 198/182 |
| 3,838,767 | 10/1974 | Taylor | 198/831 X |
| 3,991,876 | 11/1976 | Schmidt, Sr. et al. | 198/831 |
| 4,227,610 | 10/1980 | Gerdes et al. | 198/831 |
| 4,260,053 | 4/1981 | Onodera | 198/831 X |
| 4,653,632 | 3/1987 | Timmer et al. | 198/848 |
| 4,887,708 | 12/1989 | Brown et al. | 198/831 |
| 4,930,621 | 6/1990 | Brown et al. | 198/831 |
| 4,951,807 | 8/1990 | Roinestad et al. | 198/831 X |
| 5,038,925 | 8/1991 | Chrysler | 198/831 |

FOREIGN PATENT DOCUMENTS

| | | | |
|---|---|---|---|
| 2203902 | 8/1972 | Germany | 198/831 |
| 0157608 | 9/1983 | Japan | 198/831 |

Primary Examiner—James R. Bidwell
Attorney, Agent, or Firm—Wells, St. John, Roberts, Gregory & Matkin

[57] ABSTRACT

A potato harvester having an infeed conveyor and a discharge conveyor includes a curved-path corner conveyor for conveying harvested potatoes along a continuously curved path from the infeed conveyor to the discharge conveyor. The corner conveyor includes an endless arcuate belt with upper and lower flights. A corner frame supports and guides the upper flight of the endless belt in an arcuate path from an infeed end which receives potatoes from the infeed conveyor to an outfeed end which delivers potatoes onto the discharge conveyor. Upstream and downstream lower idler assemblies are positioned to support the lower flight of the endless belt at spaced locations along its length, while allowing a belt loop to form between and beneath the lower idler assemblies. A drive wheel assembly within the belt loop is downwardly biased to frictionally engage and drive the endless belt. A driven slack take-up wheel frictionally engages the lower flight of the endless belt downstream from the drive wheel assembly and provides increased friction between the drive wheel assembly and the endless belt.

26 Claims, 8 Drawing Sheets

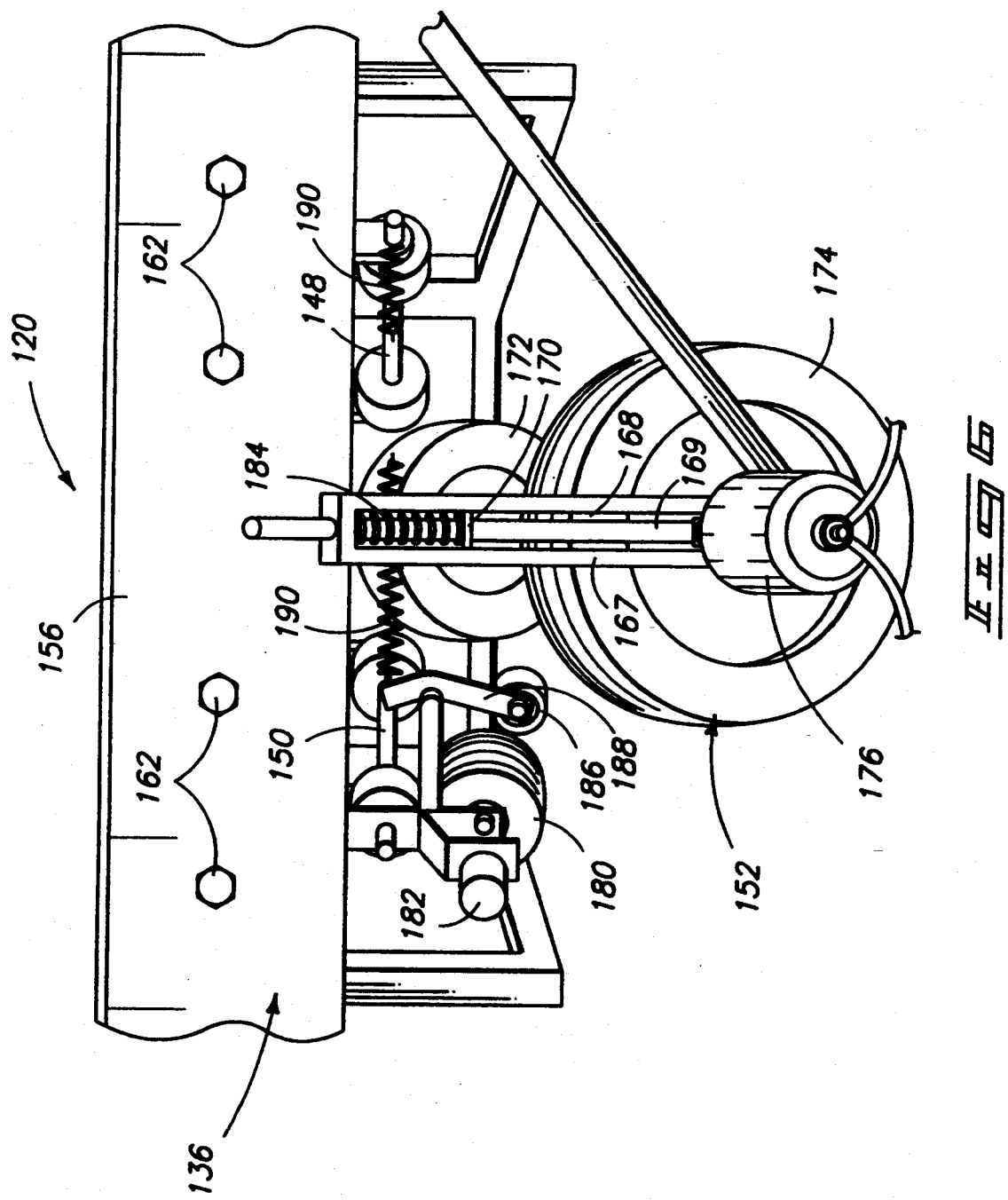

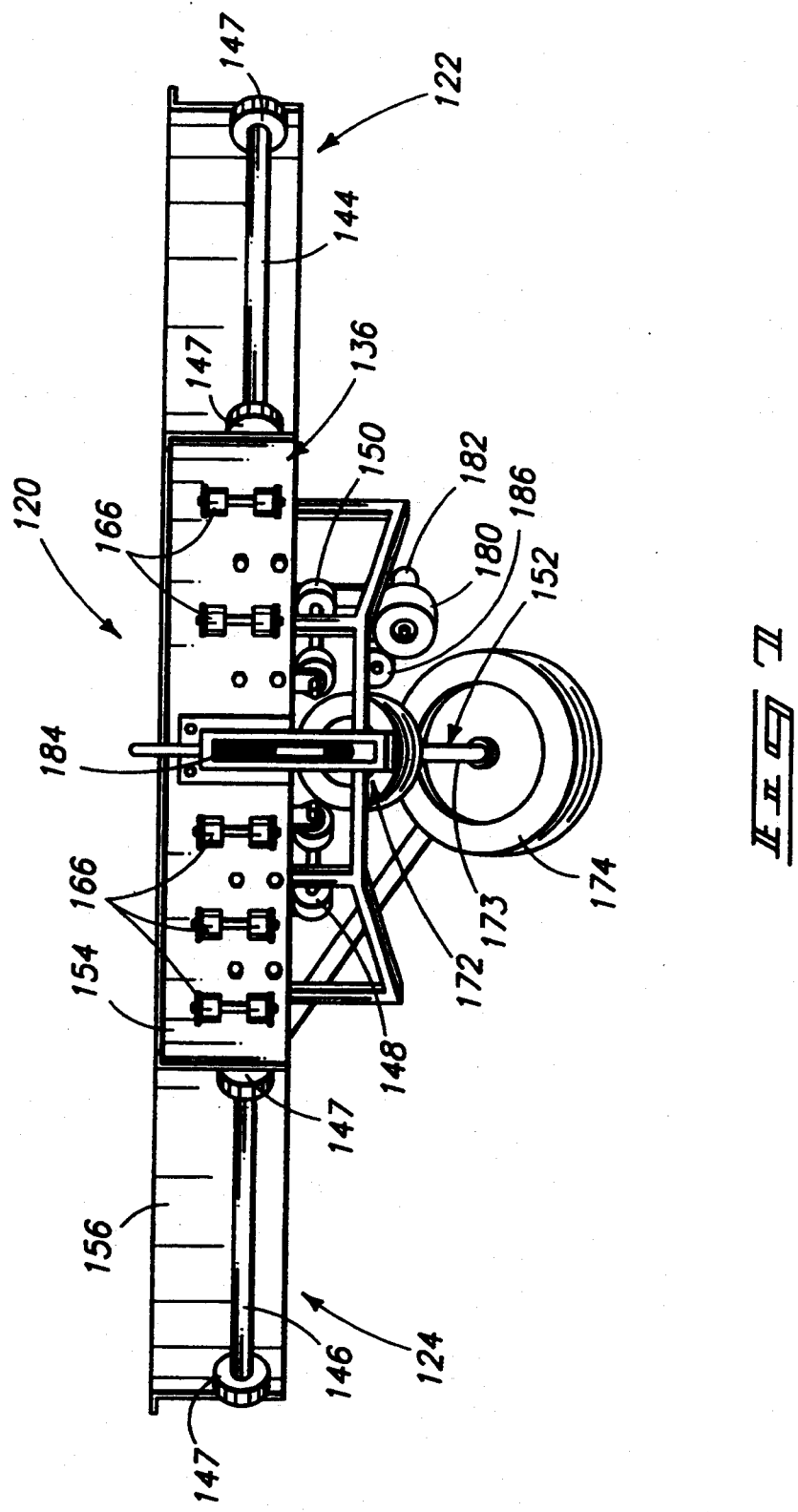

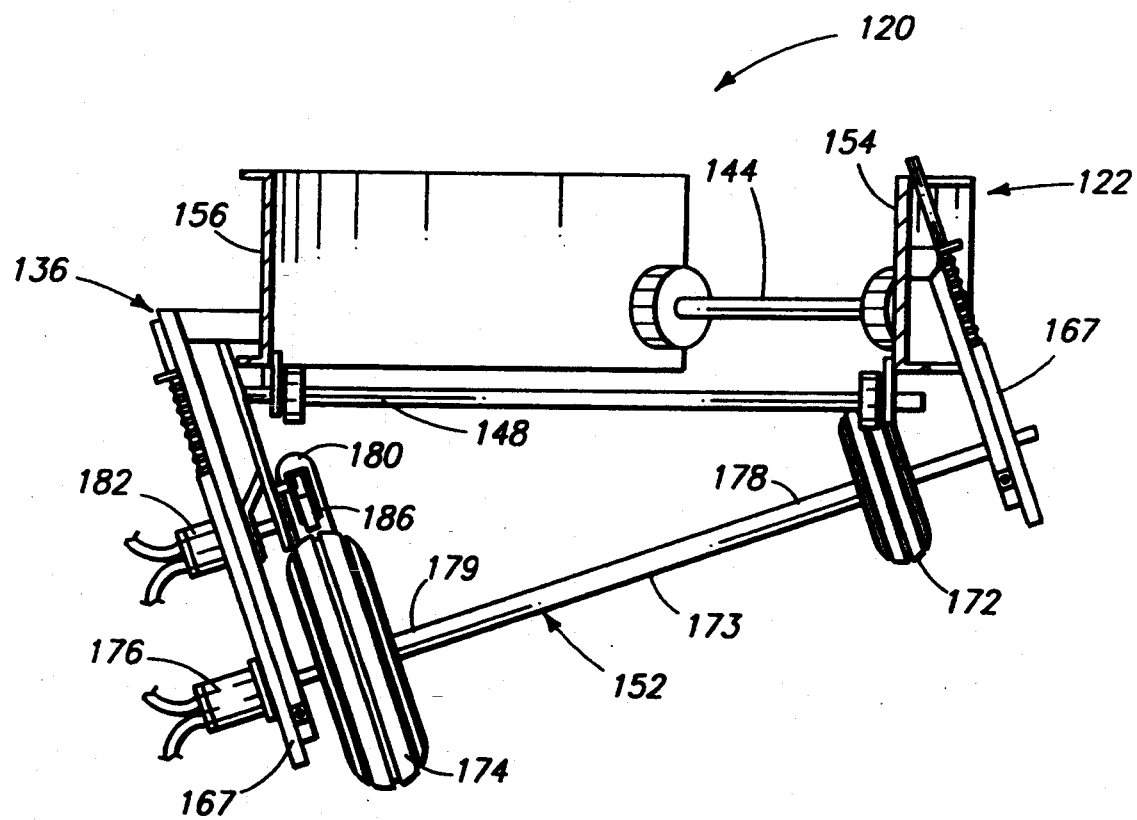

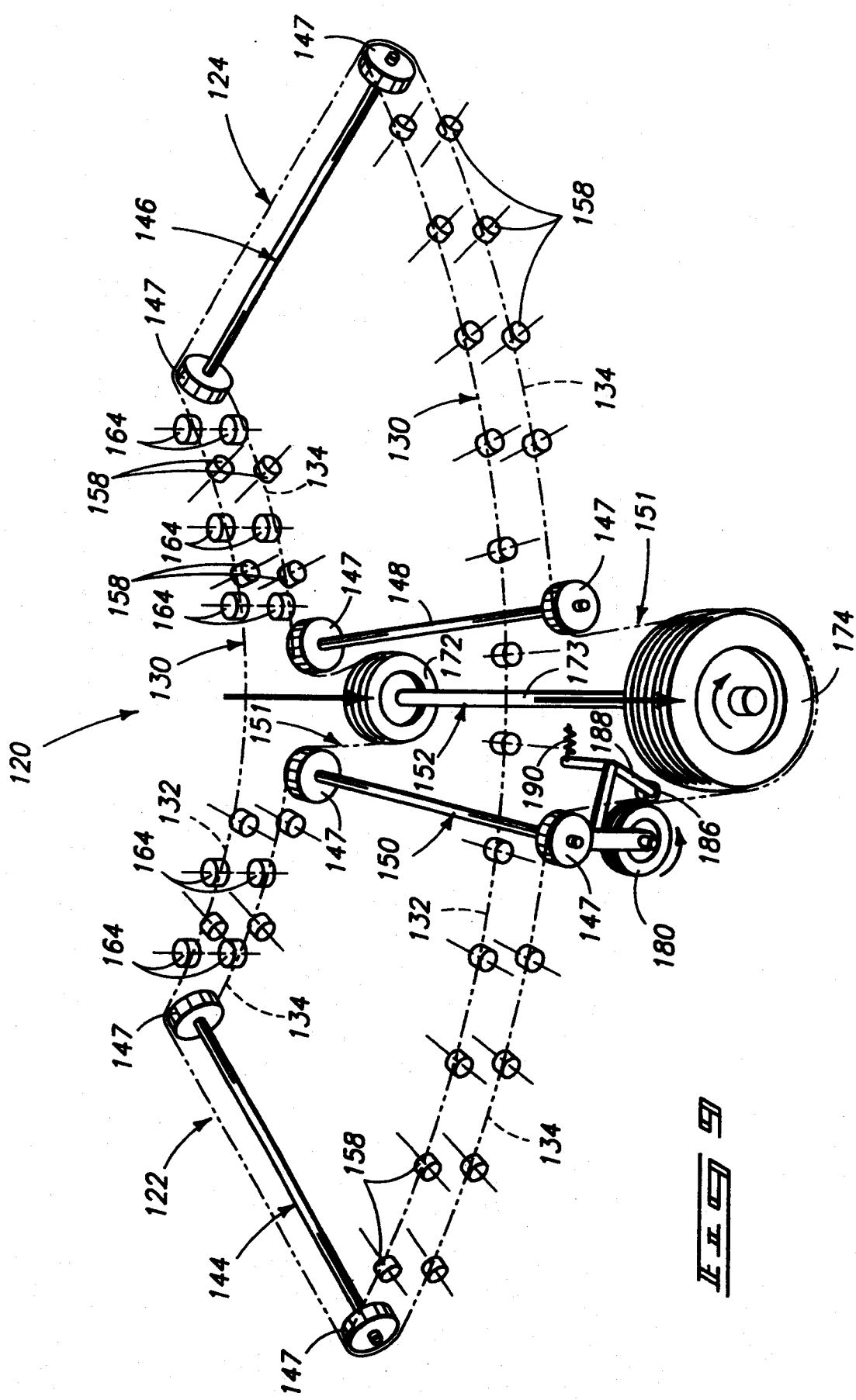

ARCUATE PATH CHAIN BELT HARVESTER

TECHNICAL FIELD

This invention relates to arcuate or curved path belt conveyors for potato harvesters.

BACKGROUND OF THE INVENTION

FIG. 1 shows a conventional prior art potato harvester 10. Harvester 10 comprises generally a potato digging apparatus 12, an infeed conveyor 14, and a discharge conveyor 16. A potato harvester such as that shown in FIG. 1 is typically towed behind a tractor. The harvester conveyors separate harvested potatoes from soil and debris while also elevating the potatoes for discharge into a truck (not shown) which follows alongside the harvester.

Infeed conveyor 14 extends parallel to the harvester's direction-of-travel, inclining upwardly from a front, lower, infeed end 18 to a rear, upper, outfeed end 20. Discharge conveyor 16 extends transversely to the harvester's direction-of-travel, from an infeed end 22, in the proximity of infeed conveyor outfeed end 20, to an outfeed end 24. Discharge conveyor 16 receives potatoes from outfeed end 20 of infeed conveyor 14 and transfers them transversely over the side of the following truck.

The infeed end 22 of discharge conveyor 16 is generally placed beneath the outfeed end 20 of infeed conveyor 14 so that harvested potatoes drop from infeed conveyor 14 onto discharge conveyor 16. The distance of the drop usually exceeds several inches.

While the drop from infeed conveyor 14 onto discharge conveyor 16 is generally accepted as being a required result of harvester structure, it is a frequent cause of damage to harvested potatoes. The impact when the potatoes hit discharge conveyor 16 bruises the potatoes and results in subsequent price reductions when the potatoes are sold.

It is therefore desirable to provide a potato harvester which, while continuing to move potatoes transversely to the harvester's direction-of-travel into a following truck, does not require the potatoes to drop any significant distance from one conveyor to another. The invention described below meets this objective in a reliable and economical manner.

BRIEF DESCRIPTION OF THE DRAWINGS

A preferred embodiment of the invention is described below with reference to the accompanying drawings:

FIG. 6 is a fragmentary side view of the corner conveyor of FIG. 3;

FIG. 7 is a side view of the corner conveyor of FIG. 3;

FIG. 8 is a sectional view of the corner conveyor of FIG. 3 taken along lines 8—8 of FIG. 3; and FIG. 9 is a diagrammatic view of the corner conveyor of FIG. 3.

DETAILED DESCRIPTION OF THE PREFERRED EMBODIMENTS

This disclosure of the invention is submitted in furtherance of the constitutional purposes of the U.S. Patent Laws "to promote the progress of science and useful arts." U.S. Constitution, Article 1, Section 8.

Figure 1:
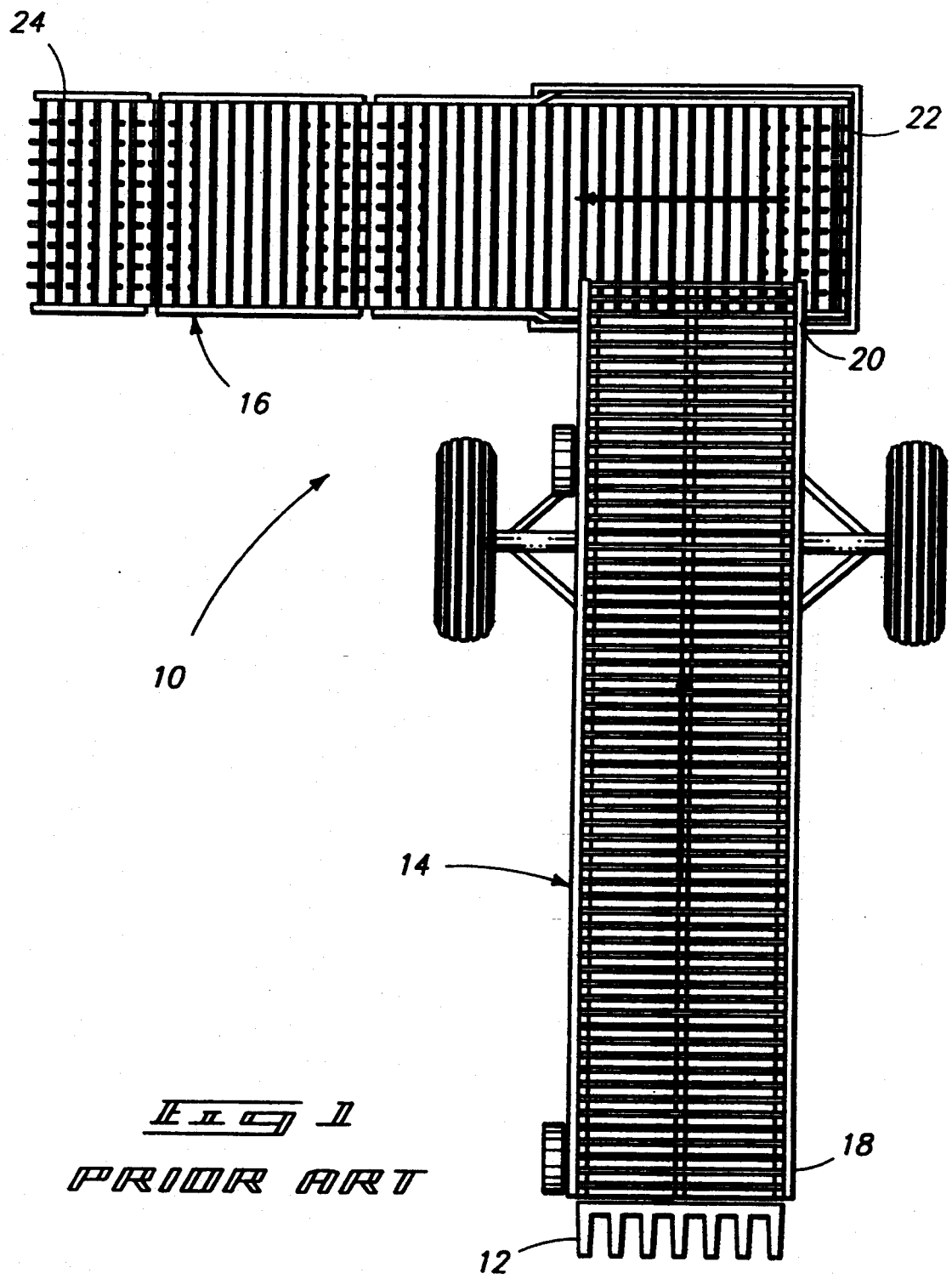
FIG. 1 is a top view of a prior art potato harvester.
Figure 2:
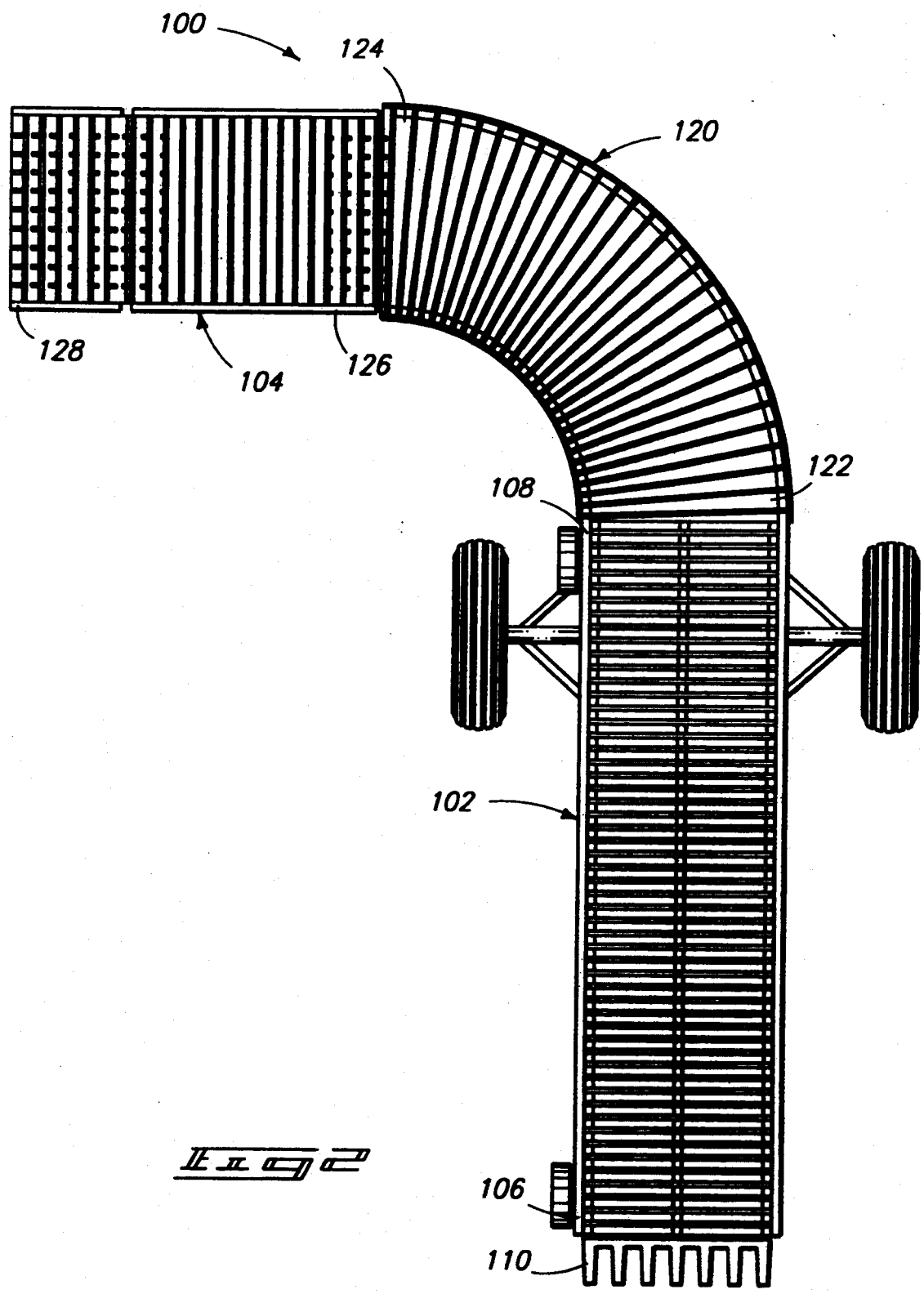
FIG. 2 is a top view of a preferred embodiment potato harvester in accordance with the invention.

FIG. 2 shows a preferred embodiment potato harvester 100 in accordance with this invention. Harvester 100 is supported by a wheeled frame (not shown) and is normally coupled to a tractor which tows the harvester through a field to harvest the potatoes in the field. Potato harvester 100 includes an infeed conveyor 102 and a discharge conveyor 104 at approximately right angles to each other. Infeed conveyor 102 extends generally parallel to the harvester's direction-of-travel, being inclined upwardly from a lower, forward, infeed end 106 to an upper, rearward, outfeed end 108. A tine or shovel apparatus 110 is positioned at infeed end 106 of infeed conveyor 102 for digging potatoes from the soil. Harvested potatoes travel upwardly and rearwardly from shovel apparatus 110 along infeed conveyor 106.

Discharge conveyor 104 extends generally transversely or perpendicular to infeed conveyor 102 and to the harvester's direction-of-travel, having an infeed end 126 and an outfeed end 128. Discharge conveyor 104 may also be inclined to route harvested potatoes into a truck. Discharge conveyor 104 typically has several sections which can be variously angled over truck side walls to reduce the height from which the harvested potatoes fall into the truck.

A corner, continuously-curved, arcuate path conveyor assembly 120 extends generally horizontally between outfeed end 108 of infeed conveyor 102 and infeed end 126 of discharge conveyor 104. Corner conveyor 120 has an infeed end 122 which receives potatoes from infeed conveyor 102 and an outfeed end 124 which provides potatoes to discharge conveyor 104. It extends along a 90° arcuate path from its infeed end 122 to its outfeed end 124.

Outfeed end 108 of infeed conveyor 102 abuts infeed end 122 of corner conveyor 120. The upper flights of infeed conveyor 102 and corner conveyor 120 are at approximately the same elevation at their abutment. Thus, harvested potatoes are transferred smoothly between the two conveyors without any required drop.

Likewise, outfeed end 124 of corner conveyor 120 abuts infeed end 126 of discharge conveyor 104. The upper flights of corner conveyor 120 and discharge conveyor 104 are at approximately the same elevation at their abutment. Potatoes are therefore transferred smoothly from corner conveyor 120 to discharge conveyor 104. No significant drop is required, and the transfer does not damage the potatoes.

Before this invention there had been no successful implementation of a curved path conveyor in a potato harvester, even though the advantages of such a conveyor would have been immediately recognized by those familiar with potato harvesting. One reason for the absence of such a curved-conveyor harvester is the often-encountered problem of belt jamming. Generally, if a curved belt is not maintained in perfect alignment and tension one side of the belt will jam against its guides and drive mechanisms, in many cases damaging the conveyor or its associated machinery. Maintaining proper alignment and tension usually requires continual operator adjustment and intervention, particularly in agricultural settings where loads and the belts themselves become large, heavy, and relatively inflexible. Accordingly, curved corner conveyors are generally absent from such settings.

The design of corner conveyor 120, however, has been found to largely eliminate belt jamming. This result has been achieved through the new drive and support mechanisms described below.

FIGS. 3-9 shows corner conveyor 120 in more detail. As shown, a corner frame 136 supports an endless arcuate belt 130 along an arcuate path from infeed end 122 to outfeed end 124. Endless arcuate belt 130 therefore redirects potatoes from a direction-of-travel parallel to the harvester's to a direction of travel which is perpendicular to the harvester's.

Corner conveyor 120 provides a continuous conveyor path between a potato harvester's infeed and discharge conveyors. It conveys harvested potatoes from the infeed conveyor to the discharge conveyor without dropping or otherwise mishandling the potatoes as they pass from one conveyor to another.

The figures generally omit all or at least portions of the endless belt in order to illustrate the remaining features of the conveyor. The path of endless belt 130 through the various components is, however, shown in FIG. 9 by a pair of dashed lines representing the transverse edges of the belt.

Figure 3:
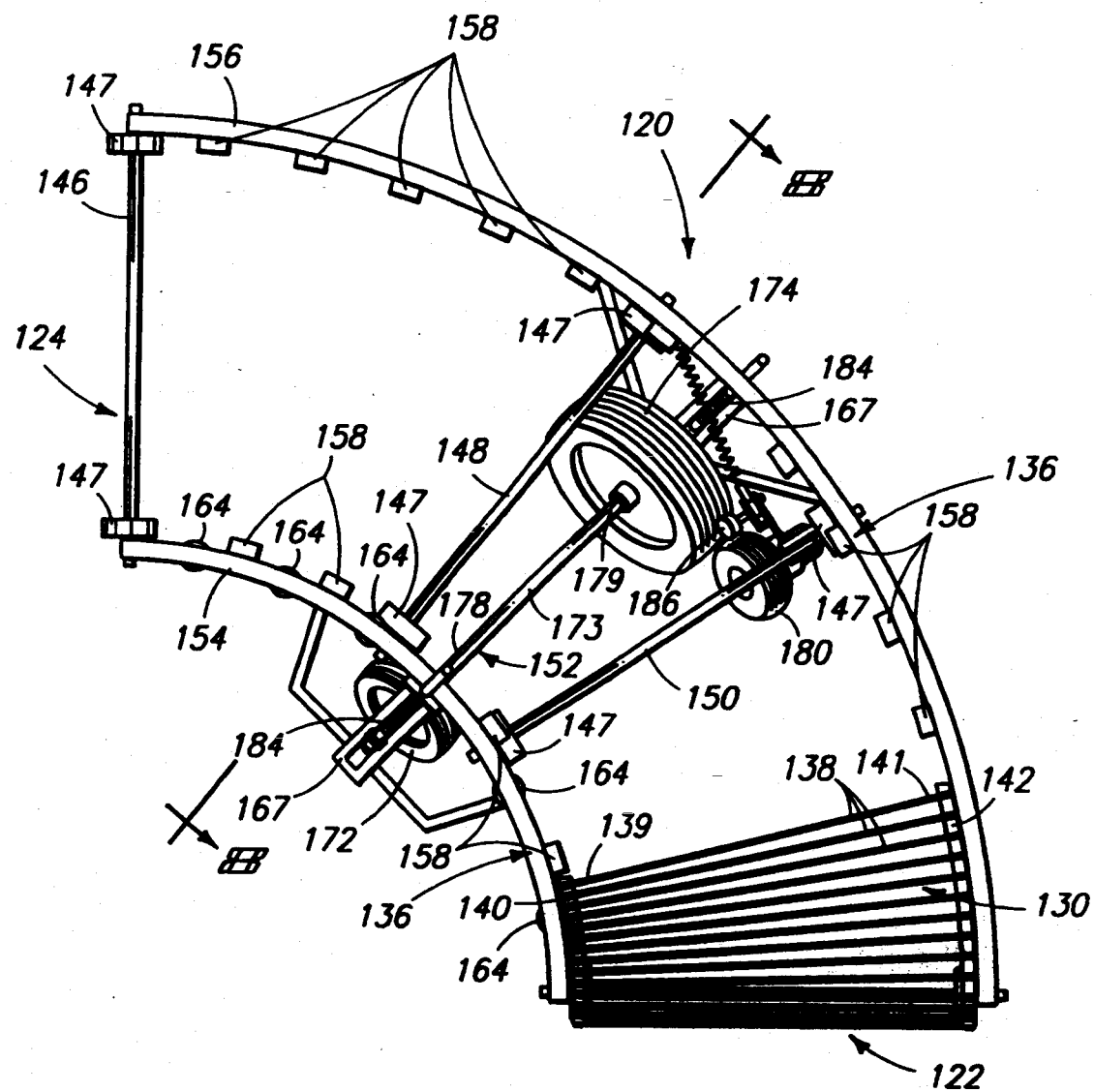
FIG. 3 is a top view of a preferred embodiment corner conveyor in accordance with this invention, with most of the conveyor belt removed for clarity.

Endless belt 130 comprises longitudinally spaced slats or rods 138 which extend transversely across the width of the belt, each rod 138 having an inner end 139 and an outer end 141 (FIG. 3). Rods 138 are suitably attached at their inner ends 139 to a flexible inner strip 140, such as is commonly used with slat-type agricultural belts. A chain could alternatively be used in place of such flexible strips, as is also common with such belts. Outer ends 141 of rods 138 are similarly attached to a flexible outer strip 142. Flexible inner and outer strips 140 and 142 define inner and outer transverse belt edges of differing lengths.

The belt construction is in accordance with standard and commonly available slat-type belts, except that belt 130 forms a continuously-curved path along its upper flight, extending through an arc of approximately 90°. The path forms an inner continuous radius along inner strip 140, and an outer continuous radius along outer strip 142. In the preferred embodiment, the inner radius is approximately half the outer radius.

To achieve these radii, transverse rods 138 are attached along inner strip 140 at about half the pitch at which they are attached to outer strip 142. Outer strip 142 is therefore approximately twice as long as inner strip 140.

Endless arcuate belt 130 has an upper flight 132 and a lower flight 134 (FIG. 9). An infeed end idler assembly 144 and an outfeed end idler assembly 146 are positioned at infeed end 122 and outfeed end 124, respectively, and at 90° to each other to abut infeed conveyor 102 and discharge conveyor 104, respectively. Each of end idler assemblies 144 and 146 preferably includes a pair of identical idler wheels 147 mounted on a common axle at transversely-opposed positions generally aligned with the inner and outer transverse edges of endless belt 130. The common axle is rotatably mounted to corner frame 136.

End idler assemblies 144 and 146 extend transversely across infeed and outfeed ends 122 and 124 to define the ends of the corner conveyor 120 arcuate path. Endless belt 130 therefore wraps around end idler assemblies 144 and 146 between its upper and lower flights 132 and 134.

Upstream and downstream lower idler assemblies 148 and 150, respectively, are positioned at spaced locations beneath lower flight 134 to support lower flight 134. Idler assemblies 148 and 150 are located toward the midpoint of the lower flight's longitudinal path, between end idler assemblies 144 and 146, to support lower flight 134 beneath and in generally parallel relationship to upper flight 132. Lower idler assemblies 148 and 150 are similar in construction to end idler assemblies 144 and 146, each comprising a pair of idler wheels 147 mounted on a common axle at transverse positions generally beneath the inner and outer transverse edges of endless belt 130. The common axle is rotatably mounted to corner frame 136.

Lower flight 134 of endless belt 130 extends from end idler assemblies 144 and 146, to lower idler assemblies 150 and 148, respectively, and downward therefrom. Endless belt 130 has excess length along lower flight 134 to form a loop 151 (FIG. 9) which extends downwardly between the opposed lower idler assemblies 148 and 150.

A drive wheel assembly or drive means 152 is positioned within downwardly-extending belt loop 151. Drive wheel assembly 152 frictionally engages the inner surfaces of belt loop 151, preferably at its transverse edges, to drive endless belt 130. Drive wheel assembly 152 also provides means for tightening endless belt 130, being spring-loaded to exert downward force on belt loop 151.

Corner frame 136 has transversely-opposed inner and outer guide walls 154 and 156, respectively, which function as belt guides for endless belt 130 (FIG. 3). Each of the inner and outer guide walls 154 and 156 has an arcuate shape corresponding to the inner and outer radii of endless arcuate belt 130. Guide walls 154 and 156 provide both vertical and lateral support to upper and lower flights 132 and 134, guiding endless belt 130 in its arcuate conveyor path from infeed end 122 to outfeed end 124.

Inner and outer guide walls 154 and 156 have a plurality of vertical support rollers 158 which rotate on transverse axes. Rollers 158 are positioned below the upper and lower flights 132 and 134 of endless belt 130 to provide vertical support to endless belt 130 at its inner and outer edges.

Figure 4:
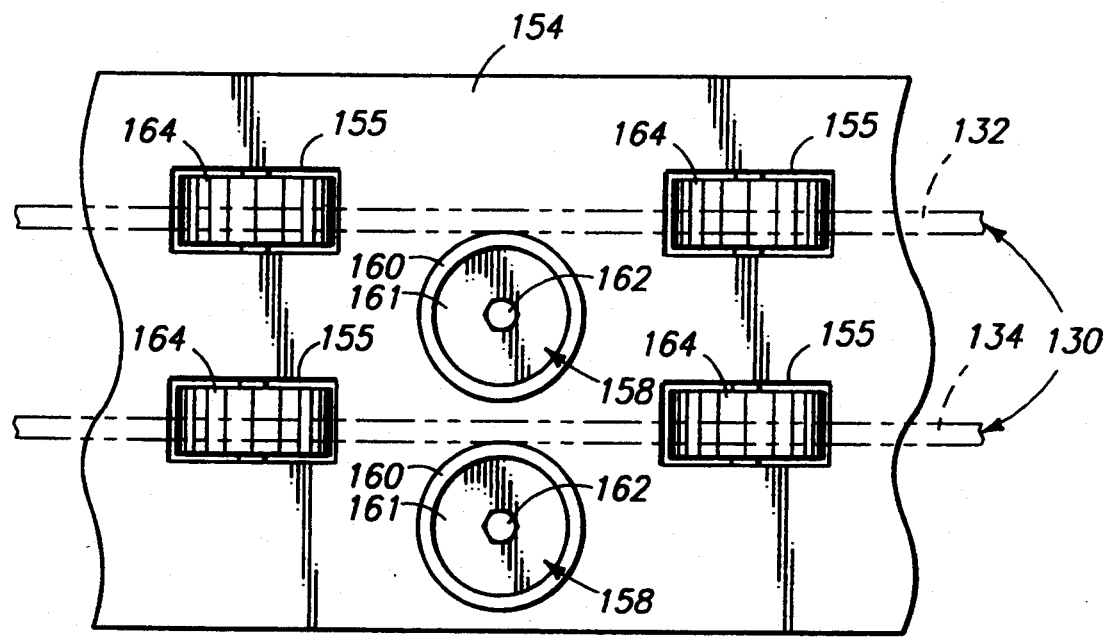
FIG. 4 is an enlarged inside view of a guide wall portion of the corner conveyor of FIG. 3.
Figure 5:
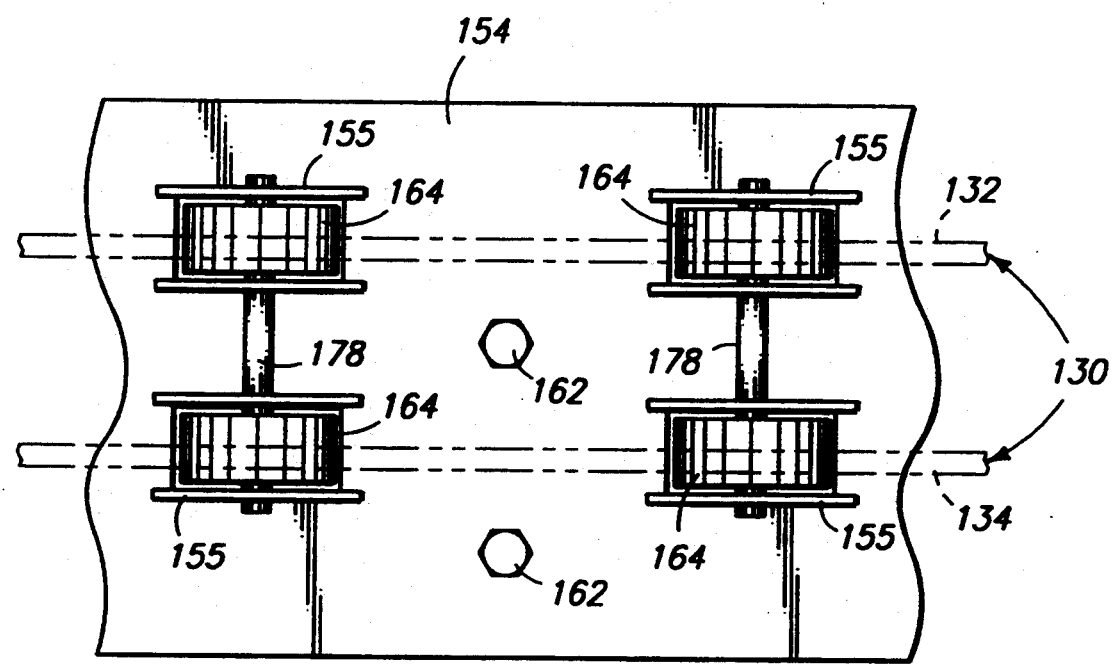
FIG. 5 is an enlarged outside view of a guide wall portion of the corner conveyor of FIG. 3.

As shown in FIGS. 4 and 5, each support roller 158 has an outer rim 160 which rotates on a central hub 161. A mounting bolt 162 extends through the wheel's hub 160 to secure the roller 158 to the guide wall.

Support rollers 158 are located as needed for vertical support beneath the transverse edges of endless belt 130. In the preferred embodiment, two support rollers 158 are provided beneath both lower flight 134 and upper flight 132 along inner guide wall 154: one pair longitudinally positioned between infeed end idler assembly 144 and downstream lower idler assembly 150, and another pair longitudinally positioned between outfeed end idler assembly 146 and upstream lower idler assembly 148.

Vertical support rollers 158 are also provided along outer guide wall 156 beneath outer flexible strip 142. The preferred embodiment incorporates a plurality of such vertical support rollers 158 on outer wall 156 to support the outer transverse edge of endless belt 130 along its upper and its lower flights.

Inner guide wall 154 has a plurality of transverse belt guide rollers 164 which rotate independently about vertical axes to contact the inner edge of endless belt 130 and to guide endless belt 130 along its arcuate path. Each vertically-aligned pair of guide rollers 164 is mounted to a single axle 178. Axles 178 are in turn mounted vertically to the outside of inner wall 154. Inner guide wall 154 has apertures 155 corresponding to the individual guide rollers 164 so that guide rollers 164 extend through inner guide wall 154 to contact the inner radius of endless belt 130. The top guide roller 164 of each pair contacts and guides the top flight of endless belt 130. The lower guide roller 164 of each pair contacts and guides the lower flight of endless belt 130. Guide rollers 164 are placed as appropriate and needed along inner wall 154.

Lower idler assemblies 148 and 150 and drive wheel assembly 152 form means for driving endless belt 130. In addition, drive wheel assembly 152 forms means for tightening endless belt 130. A drive wheel biasing means urges drive wheel assembly 152 downward against downwardly extending loop 151 of endless belt 130 to maintain endless belt 130 in longitudinal tension. The resulting downward force also forces drive wheel assembly 152 into frictional engagement with the endless belt.

Drive wheel assembly 152 includes an inner drive wheel 172 mounted to engage the inner transverse edge of endless belt 130. It also includes an outer drive wheel 174 mounted to engage the outer transverse edge of endless belt 130. Both drive wheels 172 and 174 are positioned within downwardly extending belt loop 151 to frictionally engage and drive endless belt 130. Primary motor means, preferably a hydraulic motor 176, is provided for turning the drive wheels at a common rotational speed.

In the preferred embodiment, drive wheels 172 and 174 are pneumatic tires, similar to automotive tires or other tires used in agricultural equipment. The rubber or rubber-like surface of such tires provides effective frictional engagement between the tire and the inner surfaces of endless belt 130, while allowing a needed degree of slippage to account for inaccuracies in tire diameters or belt lengths, and to also reduce any binding which might otherwise occur. The tires preferably have rounded outer peripheries.

The outer peripheries of inner and outer drive wheels 172 and 174 have first and second diameters, respectively. The first diameter is less than and approximately half of the second diameter, so that the ratio of the two diameters roughly corresponds to the ratio of the inner and outer strip 140 and 142 lengths. The drive wheels are mounted to a common axle 173 which extends transversely through belt loop 151 between wheels 172 and 174. Hydraulic motor 176 is connected to the end of the common axle 173 to drive both wheels in unison.

Drive axle 173 has inner and outer ends 178 and 179, respectively. Biasing springs 184 are operably connected to the inner and outer drive axle ends 178 and 179 to urge drive wheels 172 and 174 downward against belt loop 151 to maintain endless belt 130 in longitudinal tension and to force drive wheels 172 and 174 into frictional engagement with endless belt 130.

More specifically, the drive axle ends are received within a pair of downwardly extending mounting brackets 167, each having an open slot 168 extending vertically along its length (FIG. 6). Drive axle ends 178 and 179 are received within slot 168 for slidable movement vertically therein. A vertical strut 169 is also received within slot 168. The lower end of strut 169 is attached to drive axle 173. Biasing spring 184 is a coiled compression spring which fits over strut 169. It is positioned along strut 169 between a collar stop 170 and the top of slot 168 to exert a downward force on strut 169 and on drive axle 173. Primary motor 176 slides vertically along mounting bracket 167 along with drive axle 173.

In addition to the components already described, corner conveyor 120 preferably includes a slack take-up wheel 180 positioned along belt loop 151 between drive wheel assembly 152 and downstream lower idler assembly 150 to frictionally engage the outer edge of endless belt 130 downstream from drive wheels 172 and 174. Auxiliary motor means, preferably comprising a hydraulic motor 182, are operably connected to slack take-up wheel 180 for turning slack take-up wheel 180 and for maintaining longitudinal belt tension between outer drive wheel 174 and slack take-up wheel 180. Slack take-up wheel 180 increases frictional gripping forces between outer drive wheel 174 and endless belt 130 by maintaining such longitudinal belt tension.

Slack take-up wheel 180 preferably comprises a rubber or rubber-like pneumatic tire for effectively gripping the conveyor. The tire preferably has a rounded outer periphery.

An idler wheel 186 is positioned opposite slack take-up wheel 180, mounted to rotate on an axis generally parallel to that of slack take-up wheel 180. Endless belt 130 travels between slack take-up wheel 180 and idler wheel 186. Idler wheel 186 is biased toward slack take-up wheel 180 to force endless belt 130 into frictional engagement with slack take-up wheel 180.

More specifically, idler wheel 186 is mounted at the end of a pivot arm 188. Pivot arm 188 is spring loaded with a coiled tension spring 190 to bias idler wheel 186 toward slack take-up wheel 180.

Lower idler assemblies 148 and 150, drive wheel assembly 152, and slack take-up wheel 180 cooperate to produce maximum frictional driving forces upon endless belt 130 while eliminating problems of belt binding or jamming. The inner ends of lower idler assemblies 148 and 150 are spaced from each other at a distance approximately equal to the diameter of inner drive wheel 172. Likewise, the outer ends of lower idler assemblies 148 and 150 are spaced from each other at a distance approximately equal to the diameter of outer drive wheel 174. This results in endless belt 130 extending generally vertically from lower idler assemblies 148 and 150 to inner and outer drive wheels 172 and 174, ensuring that endless belt 130 surrounds and contacts as much as possible of the peripheries of inner and outer drive wheels 172 and 174. Lower idler assemblies 148 and 150 are preferably spaced to ensure that endless belt 130 contacts or engages approximately 180 degrees or more of the drive wheel peripheries.

Slack take-up wheel 180 and idler 186 form slack take-up means for maintaining longitudinal tension in endless belt 130 immediately downstream of outer drive wheels 172 and 174 and for thereby increasing frictional contact between the drive wheels and endless belt 130. Primary hydraulic motor 176 and auxiliary hydraulic motor 182 are sized and driven so that auxiliary motor 182 supplies a slight positive tension on endless belt 130 downstream of primary motor 176. This takes up any belt slack which might otherwise be produced downstream of outer drive wheel 174 and produces increased frictional forces between endless belt 130 and drive wheel assembly 152.

Several of the specific features described above are at least in part responsible for the reliability of the corner conveyor. First, the use of strictly frictional forces to drive the endless belt, rather than direct belt engagement methods utilizing cogs or sprockets, allows slight belt slippage which has been found to reduce jamming tendencies. In addition, the use of hydraulic motors for drive means further enhances conveyor operation and reliability by applying a constant driving force rather than a constant speed as might be provided by other driving arrangements. The compliant nature of the forces applied by the hydraulic motors enables them to accommodate slight or even more significant changes in speed and load while maintaining even and constant forces against endless belt 130.

Furthermore, the unique arrangement of vertical belt support rollers, guide rollers, and idler assemblies also contributes to reduced jamming, while tolerating a significant degree of belt misalignment. The specific guide components result in a self-aligning and self-tightening conveyor belt so that there is little or no need for operator adjustment. The advantages are achieved in a structure which is not significantly more complex than standard, linear path agricultural conveyors.

The practical result of the invention, at least when employed in a potato harvester, is the elimination of the rough handling formerly accorded potatoes as they were being harvested. This result is obtained in a simple, reliable, and inexpensive manner, providing a practical enhancement to existing forms of potato harvesters and other agricultural equipment.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A corner conveyor comprising:
   an endless arcuate belt having upper and lower flights, the endless belt having inner and outer transverse edges of differing lengths;
   a corner frame which supports the upper flight of the endless belt in an arcuate conveyor path from an infeed end to an outfeed end;
   upstream and downstream lower idler assemblies positioned to support the lower flight of the endless belt;
   the lower flight of the endless belt having excess length sufficient forming a loop extending downwardly from the lower idler assemblies;
   a drive axle extending transversely through the downwardly-extending belt loop;
   a pair of drive wheels mounted on the drive axle, the drive wheels having outer peripheries which frictionally engage the endless belt within its downwardly-extending loop; and
   a motor operably connected to rotate the drive axle and the drive wheels to drive the endless belt.

2. The corner conveyor of claim 1, wherein the path of the upper flight of the endless belt forms an arc of approximately 90 degrees.

3. The corner conveyor of claim 1, wherein the upstream and downstream lower idler assemblies are spaced from each other so that the endless belt extends generally vertically downward therefrom to engage approximately 180 degrees of the drive wheel periphery.

4. The corner conveyor of claim 1, the drive means comprising:
   a drive axle extending transversely through the downwardly-extending belt loop;
   a pair of drive wheels mounted on the drive axle, the drive wheels having outer peripheries which frictionally engage the endless belt within its downwardly-extending loop; and
   at least one biasing spring connected between the corner frame and the drive axle to urge the drive wheel assembly downward against the downwardly-extending loop of the endless belt to tighten the endless belt and to force the drive wheel assembly into frictional engagement with the endless belt.

5. The corner conveyor of claim 1, the drive means comprising:
   a drive axle extending transversely through the downwardly-extending loop;
   an inner drive wheel mounted on the drive axle to engage the inner edge of the endless belt;
   an outer drive wheel mounted on the drive axle to engage the outer edge of the endless belt, the inner drive wheel having a smaller diameter than the outer drive wheel;
   the drive wheels having outer peripheries which frictionally engage the endless belt within its downwardly-extending loop; and
   a motor operably connected to rotate the drive axle and the drive wheels to drive the endless belt.

6. The corner conveyor of claim 1, the drive means comprising at least one drive wheel positioned within the downwardly-extending belt loop to frictionally engage and drive the endless belt;
   the corner conveyor further comprising a driven slack take-up wheel positioned downstream from the drive wheel along the downwardly-extending belt loop to provide increased friction between the drive wheel and the endless belt.

7. The corner conveyor of claim 1, the drive means comprising at least one drive wheel positioned within the downwardly-extending belt loop to frictionally engage and drive the endless belt, the corner conveyor further comprising:
   a driven slack take-up wheel positioned downstream from the drive wheel along the downwardly-extending belt loop to provide increased friction between the drive wheel and the endless belt; and
   an idler wheel positioned opposite the slack take-up wheel, the endless belt extending between the slack take-up wheel and the idler wheel, the idler wheel being biased toward the slack take-up wheel to force the endless belt into frictional engagement with the slack take-up wheel.

8. A corner conveyor comprising:
   an endless arcuate belt having upper and lower flights, the endless belt having inner and outer transverse edges of differing lengths;
   a corner frame which supports the upper flight of the endless belt in an arcuate conveyor path from an infeed end to an outfeed end;

upstream and downstream lower idler assemblies positioned to support the lower flight of the endless belt;

the lower flight of the endless belt having excess length sufficient forming a loop extending downwardly from the lower idler assemblies; and drive means positioned within the downwardly-extending belt loop for tightening and driving the endless belt;

the drive means comprising at least one drive wheel positioned within the downwardly-extending belt loop to frictionally engage and drive the endless belt, the corner conveyor further comprising:

a slack take-up wheel positioned downstream from the drive wheel along the downwardly-extending belt loop to provide increased friction between the drive wheel and the endless belt; and hydraulic motors operably connected to drive the drive wheel and the slack take-up wheel.

9. In a potato harvester having an infeed conveyor and a discharge conveyor, a corner conveyor assembly for conveying harvested potatoes along an arcuate path from the infeed conveyor to the discharge conveyor, the corner conveyor assembly comprising:

an endless arcuate belt having upper and lower flights, the endless belt having inner and outer transverse edges of differing lengths;

a corner frame which supports and guides the upper flight of the endless belt in an arcuate path from an infeed end which receives potatoes from the infeed conveyor to an outfeed end which delivers potatoes onto the discharge conveyor;

upstream and downstream lower idler assemblies positioned to support the lower flight of the endless belt at spaced locations along its length;

the lower flight of the endless belt having excess length forming a loop extending downwardly between the lower idler assemblies;

at least one drive wheel positioned within the downwardly-extending belt loop to frictionally engage and drive the endless belt; and a motor-driven slack take-up wheel positioned between the drive wheel and the downstream lower idler assembly to frictionally engage the lower flight of the endless belt downstream from the drive wheel, the slack take-up wheel providing increased friction between the drive wheel and the endless belt.

10. In the potato harvester of claim 9, the corner conveyor assembly further comprising:

a drive axle extending transversely through the downwardly-extending belt loop, the drive wheel being mounted on the drive axle; and a hydraulic motor which is operably connected to the drive axle to rotate the drive wheel.

11. In the potato harvester of claim 9, the corner conveyor assembly further comprising:

a drive axle extending transversely through the downwardly-extending belt loop, the drive wheel being mounted on the drive axle; and at least one biasing spring operably connected to the drive axle to urge the drive wheel against the belt loop, to tighten the endless belt, and to force the drive wheel into frictional engagement with the endless belt.

12. In the potato harvester of claim 9, the corner conveyor assembly further comprising:

an idler wheel positioned opposite the driven slack take-up wheel, the endless belt extending between the slack take-up wheel and the idler wheel, the idler wheel being biased toward the slack take-up wheel to force the endless belt into frictional engagement with the slack take-up wheel.

13. In the potato harvester of claim 9, further comprising a hydraulic motor operably connected to drive the slack take-up wheel.

14. In the potato harvester of claim 9, wherein the upstream and downstream lower idler assemblies are spaced from each other so that the endless belt extends generally vertically downward therefrom to engage approximately 180 degrees of the drive wheel periphery.

15. In the potato harvester of claim 9, wherein the upstream and downstream lower idler assemblies are spaced from each other so that the endless belt extends generally vertically downward therefrom to engage approximately 180 degrees of the drive wheel periphery;

the corner conveyor assembly further comprising drive wheel biasing means for urging the drive wheel against the downwardly-extending loop of the endless belt to tighten the endless belt and to force the drive wheel into frictional engagement with the endless belt.

16. In the potato harvester of claim 9, the corner frame comprising:

vertical support rollers on transverse axes to support the endless belt along its inner and outer edges;

guide rollers on vertical axes which contact the inner edge of the endless belt and guide the endless belt along its arcuate path.

17. In the potato harvester of claim 9, the corner conveyor assembly further comprising:

drive wheel biasing means for urging the drive wheel against the downwardly-extending loop of the endless belt to tighten the endless belt and to force the drive wheel into frictional engagement with the endless belt.

18. In a potato harvester having an infeed conveyor and a discharge conveyor, a corner conveyor assembly for conveying harvested potatoes along an arcuate path from the infeed conveyor to the discharge conveyor, the corner conveyor assembly comprising:

an endless arcuate belt having upper and lower flights, the endless belt having inner and outer transverse edges of differing lengths;

a corner frame having transversely-opposed inner and outer belt guides which support and guide the upper flight of the endless belt in an arcuate path from an infeed end which receives potatoes from the infeed conveyor to an outfeed end which delivers potatoes onto the discharge conveyor;

end idler assemblies extending transversely across the infeed and outfeed ends of the corner frame to define the infeed and outfeed ends of the arcuate conveyor path;

upstream and downstream lower idler assemblies longitudinally positioned between the end idler assemblies to support and position the lower flight of the endless belt beneath and in generally parallel relationship to the upper flight;

the lower flight of the endless belt having excess length sufficient to form a loop extending downwardly between the lower idler assemblies;

first and second drive wheels positioned within the downwardly-extending belt loop at the inner and outer transverse edges of the endless belt, respectively, to frictionally engage and drive the endless belt;

the lower idler assemblies being spaced from each other at a distance which ensures that the belt loop contacts approximately 180 degrees of the drive wheel peripheries;

drive wheel biasing means for urging the drive wheels into gripping engagement with the endless belt and for tightening the endless belt; and a driven slack take-up wheel transversely positioned to frictionally engage the outer transverse edge of the lower flight of the endless belt downstream from the drive wheels and to provide increased friction between the drive wheels and the endless belt.

19. In the potato harvester of claim 18, wherein the path of the upper flight of the endless belt forms an arc of approximately 90 degrees.

20. In the potato harvester of claim 18, the corner conveyor assembly further comprising:

a drive axle extending transversely through the downwardly-extending belt loop, the drive wheels being mounted on the drive axle; and a hydraulic motor operably connected to rotate the drive axle and the drive wheels to drive the endless belt.

21. In the potato harvester of claim 18, the corner conveyor assembly further comprising:

a drive axle extending transversely through the downwardly-extending belt loop, the drive wheels being mounted on the drive axle; and at least one biasing spring operably connected between the corner frame and the drive axle to urge the drive wheels downward against the downwardly-extending loop of the endless belt to tighten the endless belt and to force the drive wheels into frictional engagement with the endless belt.

22. In the potato harvester of claim 18, wherein one of the drive wheels has a smaller diameter than the other drive wheel.

23. In the potato harvester of claim 18, the corner conveyor assembly further comprising hydraulic motors operably connected to drive the drive wheels and the slack take-up wheel.

24. In the potato harvester of claim 18, wherein the upstream and downstream lower idler assemblies are spaced from each other so that the endless belt extends generally vertically downward therefrom to engage approximately 180 degrees of the drive wheel peripheries;

the corner conveyor assembly further comprising drive wheel biasing means for urging the drive wheels against the downwardly-extending loop of the endless belt to tighten the endless belt and to force the drive wheels into frictional engagement with the endless belt.

25. In the potato harvester of claim 18, the inner and outer belt guides having vertical support rollers on transverse axes to support the endless belt along its inner and outer edges;

the inner belt guide having guide rollers on vertical axes which contact the inner edge of the endless belt and guide the endless belt along its arcuate path.

26. In the potato harvester of claim 18, the corner conveyor assembly further comprising:

drive wheel biasing means for urging the drive wheels downwardly against the downwardly-extending loop of the endless belt to tighten the endless belt and to force the drive wheels into frictional engagement with the endless belt.

* * * * *